Feb. 9, 1960  R. K. BRAMLEY  2,924,287
MECHANISM FOR FORWARD AND REVERSE DRIVE OF STEERABLE WHEEL
Filed Oct. 7, 1957  3 Sheets-Sheet 1

INVENTOR.
Robert K. Bramley
BY Woodling & Krost
Atty's.

Feb. 9, 1960 R. K. BRAMLEY 2,924,287
MECHANISM FOR FORWARD AND REVERSE DRIVE OF STEERABLE WHEEL
Filed Oct. 7, 1957 3 Sheets-Sheet 2

INVENTOR.
Robert K. Bramley
BY Woodling & Krost
Atty's.

Feb. 9, 1960 R. K. BRAMLEY 2,924,287
MECHANISM FOR FORWARD AND REVERSE DRIVE OF STEERABLE WHEEL
Filed Oct. 7, 1957 3 Sheets-Sheet 3

INVENTOR.
Robert K. Bramley
BY Woodling & Krost
Atty's.

United States Patent Office 2,924,287
Patented Feb. 9, 1960

2,924,287

MECHANISM FOR FORWARD AND REVERSE DRIVE OF STEERABLE WHEEL

Robert K. Bramley, Cleveland, Ohio, assignor to Williams S. West

Application October 7, 1957, Serial No. 688,530

7 Claims. (Cl. 180—19)

My invention relates to drive mechanisms for vehicles and particularly to drive mechanisms combined with steering apparatus.

An object of my invention is to provide apparatus for controlling the driving connection between a motor and the driven wheel of a vehicle.

Another object is to provide for the facile control of a vehicle in a manner to control both the propulsion and the steering of the vehicle.

Another object is the provision for governing the operation of a vehicle having a wheel that is steerable to control the direction of the vehicle and that is driven to move the vehicle as desired.

Another object is to provide for more effective control in the operation of a vehicle wherein a wheel of the vehicle is driven and also pivoted for directing the vehicle in the desired direction.

Another object is to provide for increased safety in the operation of a vehicle that is operated by an operator who may not be riding the vehicle.

Another object is to provide for a unique and useful arrangement for driving and steering a vehicle which is controlled by an operator walking with the vehicle.

Another object is to provide novel results in operation by a unique and efficient apparatus.

Other objects and a fuller understanding of my invention may be had by referring to the following description and claims, taken in conjunction with the accompanying drawings, in which:

Figure 1:
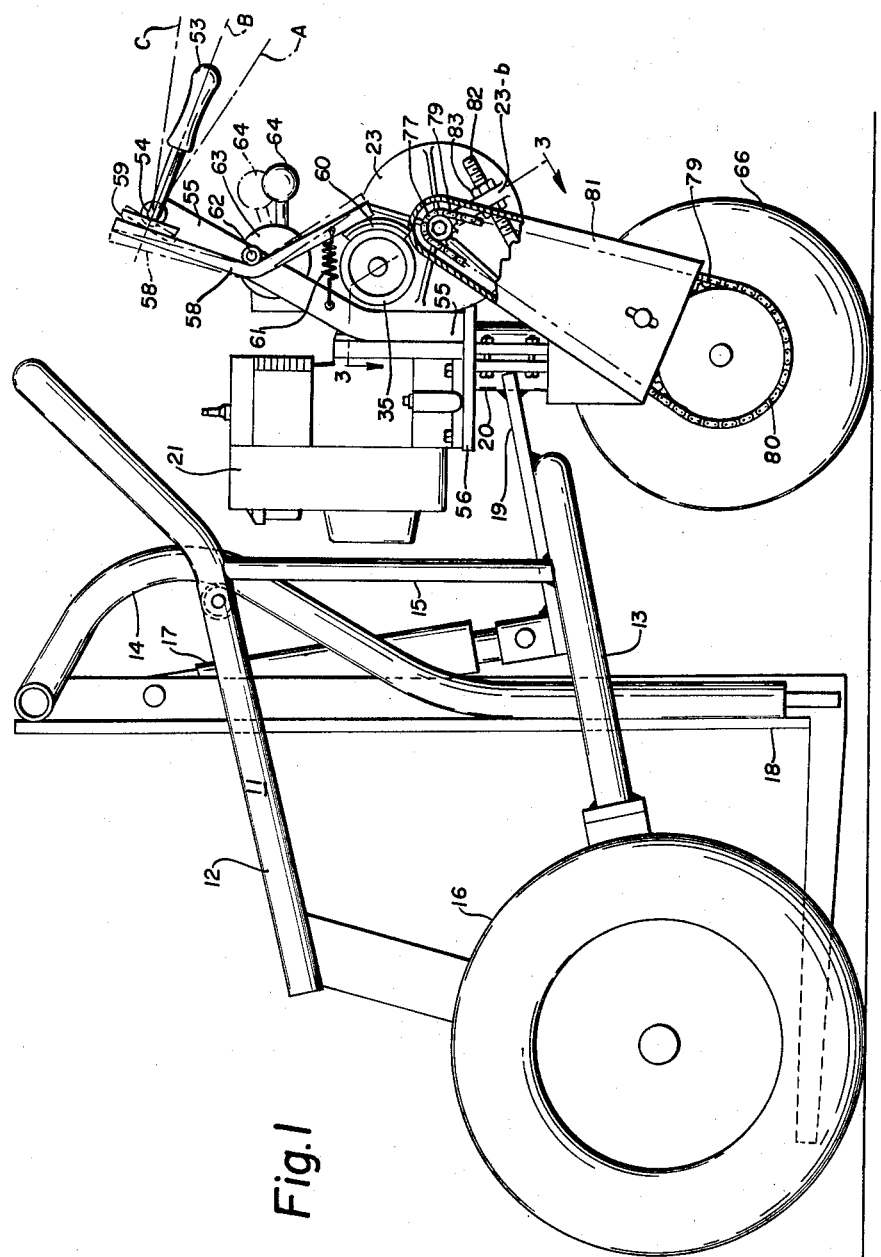
Figure 1 is a side view of a three-wheeled vehicle embodying my invention.

In the drawings, the frame of the vehicle is denoted generally by the reference character 11. This frame 11 may be fabricated of steel tubing and bars welded together to form the desired shape shown. It has an upper frame portion 12 and a lower frame portion 13. An upright guide portion 14 extends therebetween and is disposed in a form to guide the lifting of a fork lift 18 relative to the frame 11. Upright connecting pieces 15 join the upper portion 12 and the lower portion 13. Carried at the forward end of the vehicle frame are two spaced-apart wheels 16 adapted to accommodate a load therebetween, the load to be positioned on the horizontal portion of the fork lift 18. A hydraulic ram assembly 17 is disposed to raise the fork lift 18 so that the load is lifted and held at raised position during movement of the vehicle. The ram assembly 17 is adapted to lower the fork lift upon operation of the ram assembly, when desired.

The frame structure, the lifting device, and the movement of the lifting device relative to the frame structure are similar to to the device described and shown in co-pending United States application Serial No. 463,180 filed October 19, 1954 (now Patent No. 2,857,066) of common ownership.

Side portions of the lower frame portion 13 converge as they extend rearwardly and there is welded to the frame portion so as to extend rearwardly therefrom a plate portion 19. This plate portion 19 in effect is the rearward portion of the vehicle frame 11. A bearing housing 20 is welded or otherwise secured to the rearward end of the plate 19, this housing 20 having a cylindrical inner bore which acts as a bearing for the pintle or rear pivot pin 57 carrying a rear wheel 66. This rear wheel 66, being a third wheel for the vehicle, is disposed in a vertical plane intermediate vertical planes passing through the two forward wheels 16. Pivoting of the pintle or rear pivot pin 57 in the bearing housing 20 turns or pivots the wheel 66 in a manner as to steer or direct the course of the vehicle.

A motor 21, preferably an internal combustion engine, is mounted on a base plate 56 positioned over the housing 20 and secured to the pintle or pivot pin 57 carrying the rear wheel 66 in such manner that the motor 21 swings on the axis of the pintle 57 as the wheel 66 is pivoted. Thus, turning of the base plate 56 carrying the motor 21 also pivots the wheel 66 in a manner to steer the vehicle.

A housing 23 made up of assembled housing parts is positioned rearwardly of the motor 21 and is also positioned over the rear wheel 66 and carried over the pintle 57 in the housing 20 in a manner as to swing upon the axis of the pintle 57 as the wheel 66 is pivoted. Extending into the housing 23 and from the motor 21 is a motor drive shaft 22. Operation of the motor 21 rotates the drive shaft 22. Secured by a pin or otherwise so as to rotate with the shaft 22 is a beveled pinion gear 24. This beveled pinion gear 24 is enmeshed with a first beveled gear 25 and a second beveled gear 26 in a manner to rotate the gears 25 and 26 in opposite directions as the pinion gear 24 is rotated by the motor shaft 22. The beveled gears 25 and 26 are on a common axis and arranged in opposition with each other so as to both enmesh with the pinion gear 24. A first clutch plate 27 is keyed by a key member 29 to the gear 25. Another clutch plate 28 is keyed by a key member 30 to the gear 26. Thus, the driving of the gears 25 and 26 correspondingly drives the clutch plates 27 and 28 in directions opposite to each other. There is a thrust bearing assembly 31 interposed between the clutch plates 27 and 28 and there are radial bearing assemblies 32 interposed between the clutch plates 27 and 28, respectively, and a shaft 33 which extends axially through the clutch plates 27 and 28 and gears 25 and 26. It is thus seen that the motor 21 drives the clutch plates 27 and 28 about the shaft 33 so that one clutch plate revolves in one direction and the clutch plate revolves in the opposite direction about the shaft.

The shaft 33 has a toothed gear portion 34 formed thereon at an axial distance from the clutch plate 28, so as in effect to form a gear integral with the shaft 33. Keyed to the shaft 33 next adjacent the gear portion 34 is a forward clutch disk 36. This clutch disk 36 is so keyed to the shaft 33 as to rotate with the shaft and also to be movable axially with the shaft upon axial shifting of the shaft 33. Keyed to the shaft 33 adjacent its outer end is a reverse clutch disk 35, this clutch disk 35 being so secured to the shaft 33 as to rotate therewith and to be axially movable therewith upon axial shifting of the shaft 33.

Interposed between the clutch plate 27 and the clutch disk 35 is a clutch facing or lining 37 which is adapted to provide for clutching interengagement of the plate 27 and disk 35 upon axial movement of the disk 35 against the plate 27. Interposed between the plate 28 and disk 36 is clutch facing or lining 38 which is adapted to provide for clutching interengagement of the plate 28 and disk 36 upon axial movement of the disk 36 against the plate 28. The spacing of the parts is such that when the disk 35 is moved by the shaft 33 against the plate 27, then the disk 36 is moved away from the plate 28 and is out of clutching interengagement therewith. To maintain the proper alignment of the parts relative to the shaft 33, radial bearing assemblies 39 and 39–a are provided within the housing 23 so as to position the bearing assembly 39 around the gear 25 and to position the bearing assembly 39–a around the gear 26.

Positioned in axial alignment with the shaft 33, there is a thrust block 41 next adjacent to an end of the shaft. This thrust block 41 has an end face 41–a which abuts against a thrust bearing assembly 43. The thrust block 41 and the bearing assembly 43 are concentrically mounted in a cylindrical member 42. The assembly of the thrust block 41 and cylindrical member 42 is concentrically mounted in cylindrical extension 23–a of the housing 23. The cylindrical member 42 has an end shoulder 42–a which abuts the bearing assembly 43. Thus, the end face 41–a of the thrust block 41 and the shoulder 42–a of the cylindrical member 42 embrace the bearing assembly 43 therebetween. Movement of the assembly of parts 41 and 42 in one direction causes the end face 41;a to push upon the bearing assembly 43 and thus to push or shift the shaft 33 in one direction. Axial movement of the assembly of parts 41 and 42 in an opposite direction causes the shoulder 42–a to pull upon the bearing assembly 43 and thus to pull or axially shift the shaft 33 in an opposite direction.

The outer end of the thrust block 41 is hexagonal so as to form the non-circular end portion 41–b. A nut and washer assembly 44 is secured to an end of the shaft 33 securely so as to overlap the bearing assembly 43 and thus to lock to the shaft 33 the parts 41 and 42. This provides that axial shifting of the thrust block 41 also axially shifts the shaft 33. Secured to the opposite end of the shaft 33 is a nut and washer assembly 40 which abuts the inner concave portion of the clutch disk 35. The outer circumferential surface of the disk 35 is cylindrical to form a braking surface upon which a brake block 60 engages in a frictional manner to brake or retard the rotation of the disk 35 and hence the rotation of the shaft 33 and all parts movable therewith.

Figure 3:
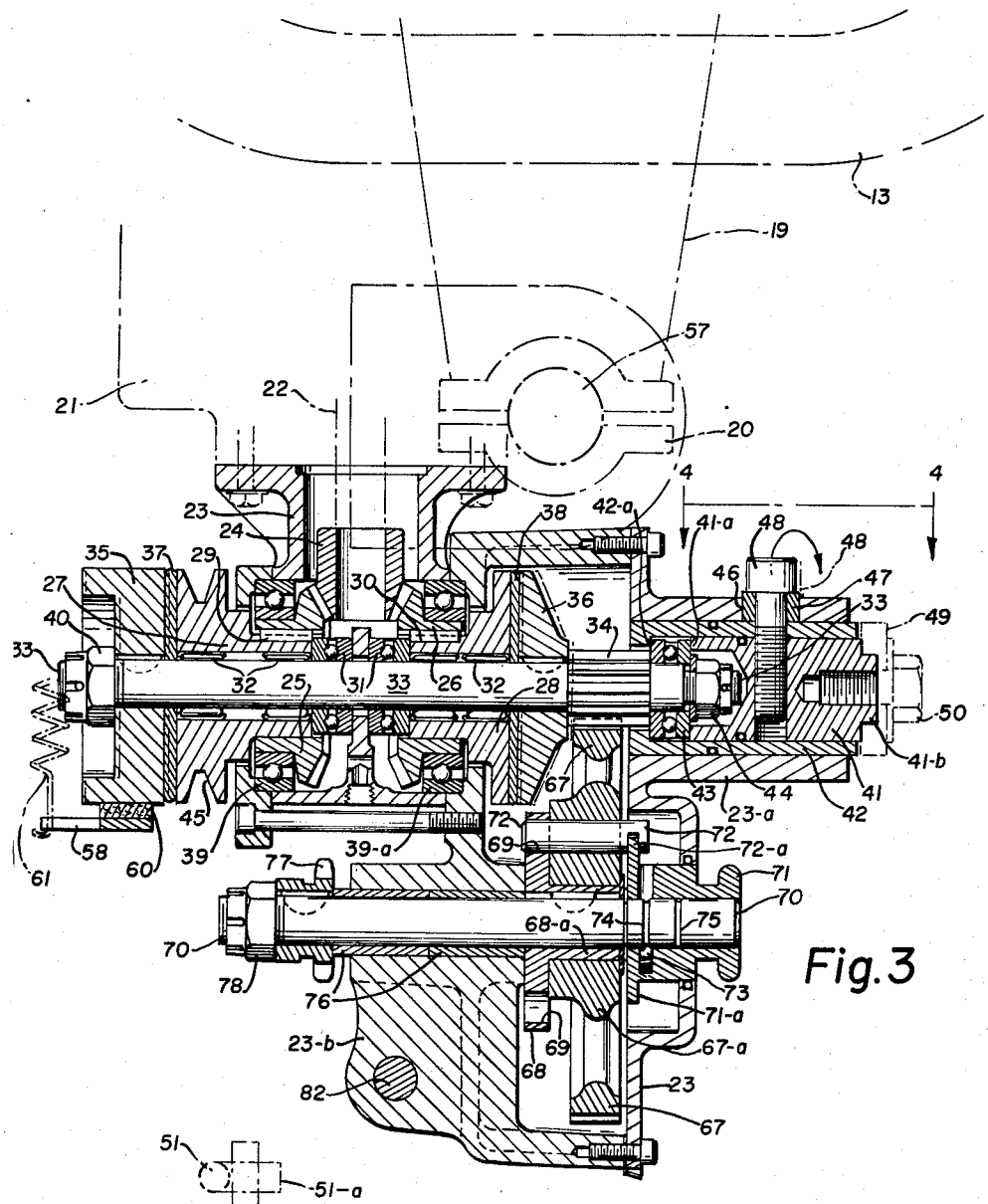
Figure 3 is an enlarged transverse sectional view taken through the line 3—3 of Figure 1 of the drive mechanism embodying my invention.
Figure 4:
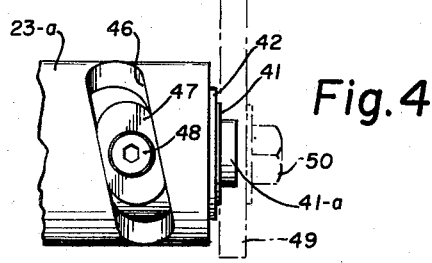
Figure 4 is a plan view of a portion of my drive mechanism showing details of the actuating features and looking in the direction of the arrows 4—4 of Figure 3.

There is provided in the wall of the housing extension 23–a a cam slot 46 which is spirally formed in the cylindrical housing extension 23–a about the axis of the thrust block 41. Positioned in this slot 46 with its spirally disposed walls is a cam follower block 47, as shown in Figures 3 and 4. A threaded bolt 48 extending through the cam follower block 47 extends through aligned openings in the cylindrical member 42 and thrust block 41 so as to tie together the cam follower block 47, the cylindrical member 42, and the thrust block 41 in such manner that the three parts 41, 42 and 47 move together as a unit. The co-action between the thrust block 47 and the slanted or spiral sides of the cam slot 46 is such that rotation of the assembly of parts 41, 42 and 47 about the axis of the thrust block 41 causes axial movement of the thrust block 41, cylindrical member 42 and cam follower block 47. There is thus provided motion-translating means whereby rotation of the thrust block 41 causes axial shifting of the shaft 33. Rotation of the parts 41, 42 and 47 in one circumferential direction causes shifting of the shaft 33 in one longitudinal direction and rotation of the parts 41, 42 and 47 in an opposite circumferential direction causes shifting of the shaft 33 in an opposite longitudinal direction.

A radius arm member 49 is secured to the non-circular end portion 41–b of the thrust block 41 by means of a bolt 50, the non-circular end portion 41–a complementarily engaging in a non-circular opening in the arm member 49 in such manner that the swing of the arm 49 rotates the thrust block 41.

Figure 5:
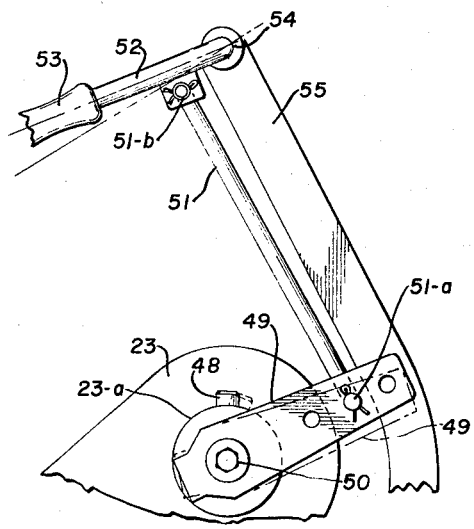
Figure 5 is an enlarged view of a portion of my apparatus looking in the direction of the arrows 5—5 of Figure 2.

As seen in Figures 4 and 5, a connecting rod 51 is pivotally connected to the arm 49 at a distance from its connection with the thrust block 41. The connecting rod 51 has a lower portion 51–a bent at right angles to the major portion of the rod 51 so as to pivotally fit within an opening within the arm 49. A plurality of openings may be provided in the arm 49 so that any one of them may be selected to accommodate the end portion 51–a of the connecting rod 51 and this provides for adjustment in the operation of the device. The upper portion of the connecting rod 51 is bent over at right angles to form the upper portion 51–b for pivotally connecting the upper portion of the connecting rod 51 to a handle bar 52 used for steering the vehicle.

Welded to and extending upwardly from the base plate 56 which carries the motor 21 and which is secured to the pintle or pivot pin 57 are a pair of upright arms 55 arranged parallel to each other and inclined rearwardly at their upper portions. These upright arms 55 pivotally carry at the upper end thereof a handle bar assembly made up of handle bars 52 having handles 53. The handle bar assembly is pivoted by means of pivoted connections 54 so that the handle bars may be raised and lowered by manually grasping the handles 53 so as to elevate or depress the handles 53. Swinging of the handles 53 of the handle bar assembly in a generally horizontal plane steers the vehicle by pivoting the upright arms 55, supporting plate 56, and rear wheel 66 about the axis of the pintle or pivot pin 57 in the bearing housing 20. Also movement of the handle bars in planes transverse to that generally horizontal plane moves the connecting rod 51. Depressing of the handles 53 lowers the connecting rod 51 so as to swing the radius arm 49 in one direction. Elevating the handles 53 raises the connecting rod 51 so as to swing the radius arm 49 in an opposite direction. Thus, raising and lowering of the handles 53 of the handle bar assembly axially shifts the shaft 33 in a direction depending upon whether the handles 53 are depressed or elevated from their normal neutral position. With the handles 53 untouched by the operator, they are in a neutral position so that the shaft 33 is not shifted in either direction by the handle bars.

Figure 2:
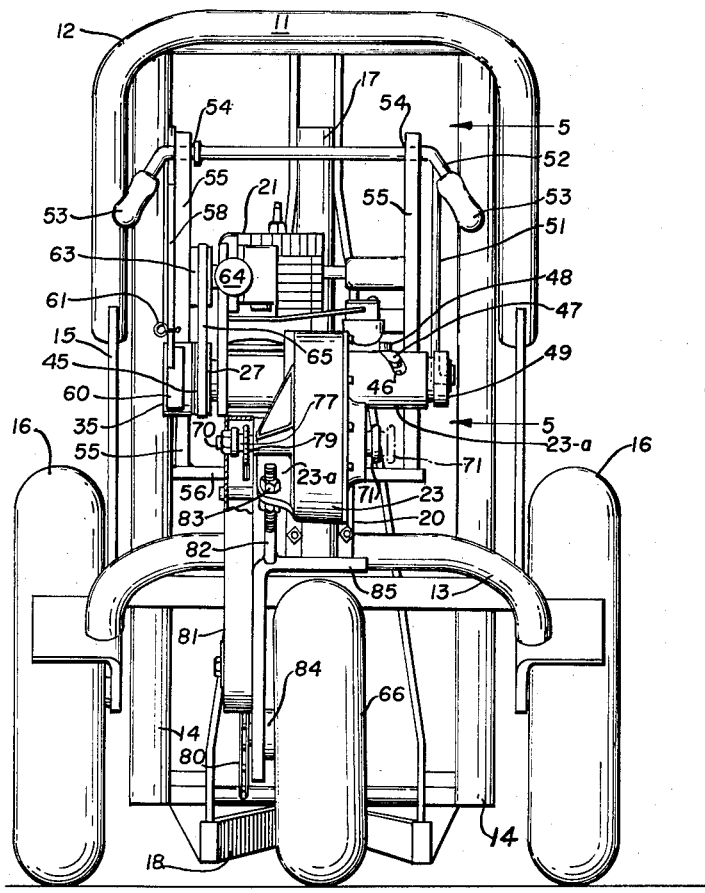
Figure 2 is a rear end view of the vehicle shown in Figure 1 and looking forwardly of the vehicle.

Pivotally connected to the left-hand upright arm 55, as seen in Figure 2, is a brake actuating rod 58 which is adapted so as to rock about a pivot connection 62 carried by the left-hand upright arm 55. A cam plate 59 carried by the handle bar assembly 52 in juxtaposition to the brake actuating arm 58 is adapted to cammingly actuate the brake actuating arm 58. When the handles 53 are in a neutral position, as indicated by the broken line B in Figure 1, the cam plate 59 is at rest and does not actuate the arm 58. However, upon depressing the handles 53 to the reverse position indicated by the broken line A in Figure 2, the cam plate rocks the actuating arm 58 to actuate the brake. Upon raising the handles 53 to the forward position indicated by the broken line C in Figure 1, the cam plate 59 again actuates the arm 58 so as to operate the brake. A coil spring 61 biases the arm 58 in a direction to urge the brake block 60 against the outer circumferential surface of the disk 35 and thus into braking position. It is when the handles 53 are depressed to position A or elevated to position C that the brake is released and the disk 35 and hence the shaft 33 are free to rotate.

There is provided a fluid pump and control valve assembly 63 for the operation of the hydraulic ram assembly 17. For convenience, this assembly 63 is carried by the arms 55 in the position shown in the drawing so that the control handle 64 and the assembly 63 may be readily manipulated by the operator walking behind the vehicle at the location of the handles 53. A flexible conduit, not shown, interconnects the pump and control assembly 63 and the hydraulic ram assembly 17. To drive the pump of the pump and control assembly 63, an endless belt drive 65 is mounted in the circular groove 45 of the clutch plate 27 so that rotation of the clutch plate 27 drives the belt 65 and hence the pump assembly 63.

A counter-shaft 70 is carried by the housing 23, and particularly by the flange portion 23–b thereof, on an axis that is parallel to the axis of the shaft 33. A gear 67 concentrically mounted about the counter-shaft 70 is enmeshed with the geared portion 34 of the shaft 33 so that rotation of the shaft 33 rotates the gear 67. A coupling plate 68 has a hub 68–a which is keyed to the counter-shaft 70 so that the counter-shaft 70 and coupling plate 68 rotate together about the axis of the counter-shaft 70. The gear 67 has a hub portion 67–a which fits about the hub portion 68–a of the coupling plate 68 and is concentric with the counter-shaft 70.

The coupling plate 68 has four holes 69 equidistantly spaced apart around the plate 68, the axes of the holes 69 being parallel to the axis of the counter-shaft 70. An interconnecting pin 72 is positioned in an opening in the hub portion 67–a of the gear 67 which also has its axis extending parallel to the axis of the counter-shaft 70. The fit of the pin 72 in this opening in the hub portion 67–a is such that the pin 72 may slide along its axis and through the opening in the hub portion 67–a. When in the position shown in Figure 3, the pin 72 complementarily fits within one of the four holes 69 in the coupling plate 68 so as to effectively interlock the plate 68 with the gear 67 and thus provide that rotation of the gear 67 simultaneously rotates the plate 68 and the counter-shaft 70. The interconnecting pin 72 may be disengaged from a hole 69 in the coupling plate 68 by axial movement thereof away from the coupling plate 68. This is done by a shifting knob 71 mounted concentrically about the counter-shaft 70 adjacent an end thereof. This shifting knob 71 has a flange portion 71–a which fits within a keyway 72–a of the connecting pin 72. Thus, axial movement of the shifting knob 71 axially shifts the pin 72. By moving the shifting knob 71 in one axial direction along the counter-shaft 70, the pin 72 fits within one of the four holes 69 with which it may be registered and thus interlocks the coupling plate 68 and counter-shaft 70 with the gear 67. Upon axial shifting of the shifting knob 71 in an opposite direction, such as to the right in Figure 3, the pin 72 is disengaged from a hole 69 in the coupling plate 68 and thus uncouples the gear 67 from the coupling plate 68 and counter-shaft 70.

To hold the shifting knob 71 in either a position for interlocking the parts or in a position for releasing the parts, a spring bias detent ball 73 is carried by the shifting knob 71 so as to resiliently engage in either a circular groove 74 or a circular groove 75 formed in the counter-shaft 70. In this manner, the shifting knob 71 may be held in either a locked or unlocked position. The pin 72 may be readily registered with one of the four holes 69 and inserted therein by reason of the chamfered end of the pin 72 which may readily enter one of the holes 69 when the pin 72 is in alignment with one of the holes 69.

Bushings 76 are provided for a bearing support of the counter-shaft 70 in the flange portion 23–b of the housing 23. A sprocket wheel 77 is keyed to the counter-shaft 70 so as to rotate therewith. A nut 78 holds the sprocket wheel 77 to the counter-shaft 70. A sprocket chain 79 engaging the chain sprocket wheel 77 is driven by the wheel 77 upon rotation of the counter-shaft 70. The chain 79 also is engaged with a sprocket wheel 80 which drives the wheel 66 of the vehicle, thus upon rotation of the counter-shaft 70, the wheel 66 of the vehicle is driven and in a direction corresponding to the direction of rotation of the counter-shaft 70. A metal guard member 81 is provided for safely guarding the chain 79 interconnecting the sprocket wheels 77 and 80. To help support the housing 23 and to maintain it at desired elevation, a supporting rod 82 extending up from the supporting structure 85 for the wheel 66 is secured to the flange portion 23–a by means of the adjusting nuts 83. By adjustment of the nuts 83 on the supporting rod 82, the elevation of the housing 23 may be adjusted. The supporting structure 85 carries a journal housing 84, the axle of the wheel 66 being housed in this journal housing 84.

From the foregoing, it is seen that an operator walking behind the vehicle may readily steer the vehicle by swinging the handle bar assembly 52 as he moves the handles 63 to the right or left as desired. Also by depressing the handles 53, the motor 21 is so operatively interconnected with the wheel 66 that the vehicle is driven forwardly by the motor 21. By the operator elevating the handles 53, the motor 21 is so operatively interconnected with the wheel 66 as to cause the vehicle to travel in a reverse direction. The handles 53 may be raised or lowered regardless of their steering position in being swung to the left or right. Upon release of the handles 53 so that they are in their neutral position, indicated by the broken line B in Figure 1, the brake automatically is actuated so as to lock the shaft 33 against rotation and thus brake or hold the vehicle against either forward or rearward movement. If it is desired to put the vehicle in free wheeling so that the wheel 66 is free and not operatively connected with the shaft 33 and parts operatively connected therewith, such as in the case of a motor breakdown, the shifting knob 71 is moved so as to pull the connecting pin 72 out of a hole 69 in the coupling plate 68. This permits the vehicle to be freely moved without the wheel 66 being in operative connection with the shaft 33 or with the motor interconnected therewith.

It is thus seen that there is provided accurate and efficient control of a motor for driving a vehicle and so associated with the steering apparatus that the steering and control of the vehicle are best arranged for the satisfactory operation of the vehicle. Vehicles of the nature illustrated are well adapted for use in the construction industry wherein materials are carried about a building site and around platforms constructed around the building. Complete and safe control of the vehicle is important and at the same time the heavy loads transported by the vehicle may be efficiently moved to required locations.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Driving mechanism for a vehicle having a frame and a wheel adapted to propel the vehicle and to steer the vehicle, said wheel being carried on a pintle pivotally journaled to said frame, the combination of a steering member operatively connected to said wheel for pivoting the same on the axis of said pintle upon swinging of the steering member in a plane transverse of said axis, a motor carried by said pintle to pivot with said wheel about said axis, transmission mechanism including a pair of axially aligned opposed clutch plates driven by said motor to rotate in opposite directions, a pair of clutch disks axially aligned with said clutch plates and each positioned to clutchingly engage a respective clutch plate upon axial movement relative thereto, and a shaft extending axially of said plates and disks, the axis of said shaft being disposed parallel to the axis of said wheel, said disks being keyed to said shaft to rotate therewith and to shift axially with said shaft, said transmission mechanism being carried by said pintle to pivot with said wheel about said axis, translating means aligned with and operatively connected to said shaft and adapted to translate rotary motion to axial movement for the axial shifting of said shaft, a motion-transmitting member extended upwardly from the axis of said shaft and interconnecting said translating means and said steering member, said steering member being movable transversely of said plane between forward and reverse positions through neutral position, and driving means interconnecting said shaft and said wheel for driving said wheel by said movement of the steering member into said positions shifting the said shaft and clutch disks relative to the clutch plates to provide forward, reverse and neutral drive connections between the motor and said wheel.

2. Driving mechanism for a vehicle having a wheel adapted to both drive and steer the vehicle, the vehicle having a steering device adapted to pivot the said wheel for the steering direction of said wheel upon turning of the steering device in one plane, said steering device having handle means swingable in arcs about the axis of said pivot, said steering device being also movable in planes transverse to said one plane upon vertical movement of said handle means, the vehicle having a motor for providing power for the driving of said wheel, comprising the combination of transmission mechanism including a shaft disposed parallel to the axis of said wheel, a pair of clutch plates journaled on said shaft to revolve thereon and directed in opposite directions, gear means adapted to be driven by said motor and arranged to revolve said clutch plates in opposite directions, and a pair of clutch disks each positioned in opposition to one of said clutch plates and adapted to alternately clutchingly engage said clutch plates, said clutch disks being keyed to said shaft to rotate with said shaft and to axially shift with said shaft, said transmission mechanism being carried by said wheel to pivot therewith in being steered by said steering device, a motion-transmitting means operatively interconnecting said shaft and said steering device to provide for axially shifting of said shaft upon movement of said steering device in said transverse planes by vertical movement of said handle means, said motion-transmitting means including an arm extending uprightly between said planes of movement of the steering device and a plane coinciding with the axis of said shaft and a translating member translating movement of said arm into axial movement of said shaft, and driving means interconnecting said shaft and said wheel for driving said wheel, the shifting of the shaft and clutch disks in one axial direction causing the shaft to be driven in one direction by the clutch plate engaged by one of the clutch disks, the shifting of the shaft and clutch disks in an opposite axial direction causing the shaft to be driven in an opposite direction by the clutch plate engaged by the other of the clutch disks, and the shifting of the shaft and clutch disks to an intermediate position causing the shaft to be non-driven by the disengagement of both clutch plates by both clutch disks.

3. Driving mechanism for a vehicle having a steering device revolvable about a vertical axis in a plane to steer the vehicle, said steering device being also simultaneously movable in planes transverse to said first mentioned plane about horizontally disposed pivots, comprising the combination of a pair of clutch plates carried by the vehicle and adapted to be driven in opposite directions, a shaft disposed in a horizontal plane and extending axially of said clutch plates, a pair of clutch disks keyed to said shaft to rotate and axially shift with said shaft, said disks being positioned in opposition to said plates, respectively, to provide alternate clutching interengagement of the plates and respective disks as said shaft and disks are axially shifted whereby the shaft is rotated in the direction of the rotation of the plate clutchingly engaged by a said disk, an actuating member disposed to translate rotary motion imparted thereto to longitudinal motion axially of the shaft for axially shifting said shaft and disks, a connecting member interconnecting said actuating member and said steering device at a distance from said axis and said pivots to impart rotary motion to the actuating member and thereby operate the actuating member by movement of the steering device in said transverse planes, the movement of the steering device in one direction axially shifting the shaft and disks to cause clutching engagement with one of said plates, the movement of the steering device in an opposite direction axially shifting the shaft and disks to cause clutching engagement with the other of the plates, gear means driven by said shaft in accordance with the direction of rotation of the shaft, and drive transmission means for driving said vehicle by said gear means, the driving of the vehicle being controlled by the movement of the steering device in said transverse planes.

4. In a vehicle having a wheel for propelling and directing the vehicle, a steering arm movable in a steering path in a first plane for pivoting said wheel about a vertical axis to direct the vehicle, a clutch mechanism adapted to be driven by a motor carried by the vehicle, said clutch mechanism having forward driving and rearward driving parts, a shaft driven by the clutch mechanism in a direction governed by the operation of said driving parts, an actuating mechanism for selectively actuating the forward driving part and the rearward driving part as alternatives, said clutch mechanism, shaft and actuating mechanism being carried by said wheel to pivot therewith, drive connecting means operatively connecting said wheel and said shaft to drive the wheel in accordance with the driving of said shaft, a connecting member extending in a direction away from said vertical axis toward said steering arm and interconnecting said actuating mechanism and said steering arm at a distance from said vertical axis, means to permit movement of said steering arm in other paths in planes transverse to said first plane for actuating said connecting member and actuating mechanism other than in said steering path to provide for actuation of the connecting member and actuating mechanism without regard to the position of the steering arm in said steering path, and braking means for automatically braking said shaft upon positioning of the clutch mechanism to neutral position.

5. In a vehicle having a steerable wheel, steering means for pivotally steering the said wheel about a vertical axis, said steering means being movable in a first arcuate path about said axis for steering and also movable in a second arcuate path about a pivot other than for steering, and a motor carried by the vehicle to pivot with said wheel, the combination of transmission mechanism including a pair of gears adapted to be driven by said motor in opposite directions on a common axis, said common axis being disposed parallel to the axis upon which said wheel rotates, a shaft disposed along said common axis, a pair of axially aligned clutch plates driven by said gears in corresponding opposite directions, and a pair of clutch disks keyed to said shaft to move therewith in both circumferential and axial directions, said each of said clutch disks being disposed in opposition to one of said clutch plates to clutchingly engage the same upon axial movement toward a respective clutch plate, said clutch disks being spaced along said shaft to provide for clutching engagement of only one clutch plate by a clutch disk at one time, said transmission mechanism being carried by said wheel to pivot therewith upon pivotal steering of said wheel, motion-translating means interconnecting said shaft and said steering means at a distance from said axis and said pivot to axially shift said shaft upon motion of the steering means in said second path while in any position in said steering path, axially shifting of said shaft being adapted to selectively clutchingly engage one or the other of said clutch disks with a respective clutch plate and to a neutral position wherein both clutch disks disengage said clutch plates, the said shaft being drivable by said clutch disks, driving means operatively connecting said shaft and said wheel for driving said wheel in accordance with the driving of said shaft, and means for automatically braking said transmission mechanism upon shifting thereof to neutral position.

6. In a vehicle having a steerable wheel, steering means for pivotally steering the said wheel, said steering means being movable in a first path for steering and also movable in a second path other than for steering, and a motor carried by the vehicle to pivot with said wheel, the combination of transmission mechanism including a pair of gears adapted to be driven by said motor in opposite directions on a common axis, a shaft disposed along said common axis, a pair of axially aligned clutch plates driven by said gears in corresponding opposite directions, and a pair of clutch disks keyed to said shaft to move therewith in both circumferential and axial directions, said each of said clutch disks being disposed in opposition to one of said clutch plates to clutchingly engage the same upon axial movement toward a respective clutch plate, said clutch disks being spaced along said shaft to provide for clutching engagement of only one clutch plate by a clutch disk at one time, said transmission mechanism being carried by said wheel to pivot therewith upon pivotal steering of said wheel, motion-translating means interconnecting said shaft and said steering means to axially shift said shaft upon motion of the steering means in said second path, axially shifting of said shaft being adapted to selectively clutchingly engage one or the other of said clutch disks with a respective clutch plate and to a neutral position wherein both clutch disks disengage said clutch plates, the said shaft being drivable by said clutch disks, braking means operatively connecting said shaft and said steering means for braking said shaft upon said shaft being moved by the motion-translating means to said neutral position, and driving means operatively connecting said shaft and said wheel for driving said wheel in accordance with the driving of said shaft.

7. In a vehicle having a steerable wheel, steering means for pivotally steering the said wheel, said steering means being movable in a first path for steering and also movable in a second path other than for steering, and a motor carried by the vehicle to pivot with said wheel, the combination of transmission mechanism including a pair of gears adapted to be driven by said motor in opposite directions on a common axis, a shaft disposed along said common axis, a pair of axially aligned clutch plates driven by said gears in corresponding opposite directions, and a pair of clutch disks keyed to said shaft to move therewith in both circumferential and axial directions, said each of said clutch disks being disposed in opposition to one of said clutch plates to clutchingly engage the same upon axial movement toward a respective clutch plate, said clutch disks being spaced along said shaft to provide for clutching engagement of only one clutch plate by a clutch disk at one time, said transmission mechanism being carried by said wheel to pivot therewith upon pivotal steering of said wheel, motion-translating means interconnecting said shaft and said steering means to axially shift said shaft upon motion of the steering means in said second path, axially shifting of said shaft being adapted to selectively clutchingly engage one or the other of said clutch disks with a respective clutch plate and to a neutral position wherein both clutch disks disengage said clutch plates, the said shaft being drivable by said clutch disks, braking means operatively connecting said shaft and said steering means for braking said shaft upon said shaft being moved by the motion-translating means to said neutral position, and driving means operatively connecting said shaft and said wheel for driving said wheel in accordance with the driving of said shaft, said driving means including a counter-shaft drivable by said shaft and a release mechanism for manually disconnecting the driving connection between said shaft and counter-shaft.

References Cited in the file of this patent

UNITED STATES PATENTS

| | | |
|---|---|---|
| 647,262 | Hay | Apr. 10, 1900 |
| 680,602 | Lieb | Aug. 13, 1901 |
| 1,456,349 | White | May 22, 1923 |
| 1,510,623 | Klausmeyer | Oct. 7, 1924 |
| 1,557,902 | Thompson | Oct. 20, 1925 |
| 2,138,239 | Irgens | Nov. 29, 1938 |
| 2,325,396 | Hastings | July 27, 1943 |
| 2,649,162 | Wooldridge et al. | Aug. 18, 1953 |

FOREIGN PATENTS

| | | |
|---|---|---|
| 279,506 | Switzerland | Mar. 17, 1952 |